No. 799,481. PATENTED SEPT. 12, 1905.
D. W. MARMON.
BEARING FOR UPRIGHT CRANK SHAFTS.
APPLICATION FILED AUG. 3, 1900.

2 SHEETS—SHEET 1.

WITNESSES:
C. S. Frye.
J. A. Walsh.

INVENTOR
Daniel W. Marmon,
BY
Chester Bradford.
ATTORNEY.

No. 799,481. PATENTED SEPT. 12, 1905.
D. W. MARMON.
BEARING FOR UPRIGHT CRANK SHAFTS.
APPLICATION FILED AUG. 3, 1900.
2 SHEETS—SHEET 2.
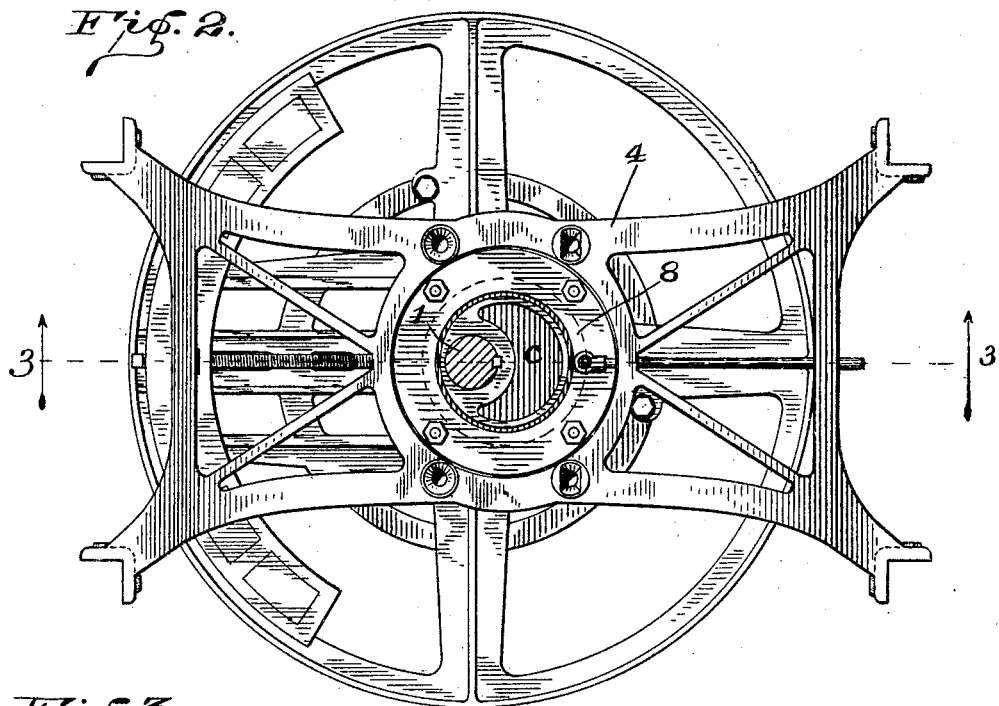
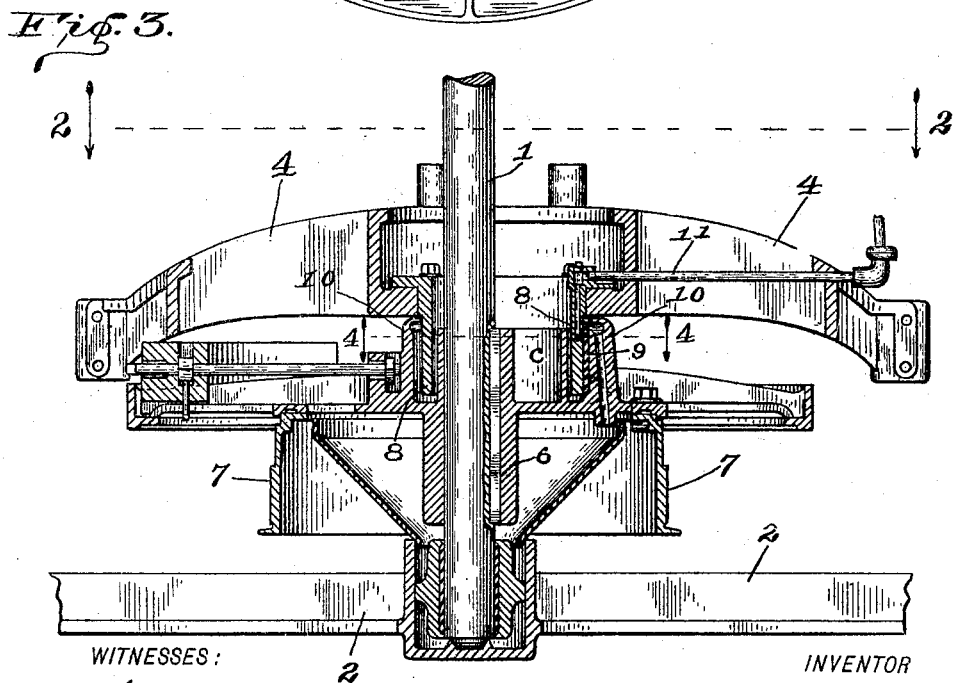
WITNESSES:
C. S. Frye.
J. A. Walsh.
INVENTOR
Daniel W. Marmon,
BY
Chester Bradford,
ATTORNEY.

UNITED STATES PATENT OFFICE.

DANIEL W. MARMON, OF INDIANAPOLIS, INDIANA, ASSIGNOR TO NORDYKE & MARMON COMPANY, OF INDIANAPOLIS, INDIANA, A CORPORATION OF INDIANA.

BEARING FOR UPRIGHT CRANK-SHAFTS.

No. 799,481.      Specification of Letters Patent.      Patented Sept. 12, 1905.

Application filed August 3, 1900. Serial No. 25,760.

*To all whom it may concern:*

Be it known that I, DANIEL W. MARMON, a citizen of the United States, residing at Indianapolis, in the county of Marion and State of Indiana, have invented certain new and useful Improvements in Bearings for Upright Crank-Shafts, of which the following is a specification.

The object of my said invention is to provide bearings for upright crank-shafts which shall embody various advantages in use and especially be capable of efficient lubrication, all as will be hereinafter more particularly described and claimed.

Figure 1:
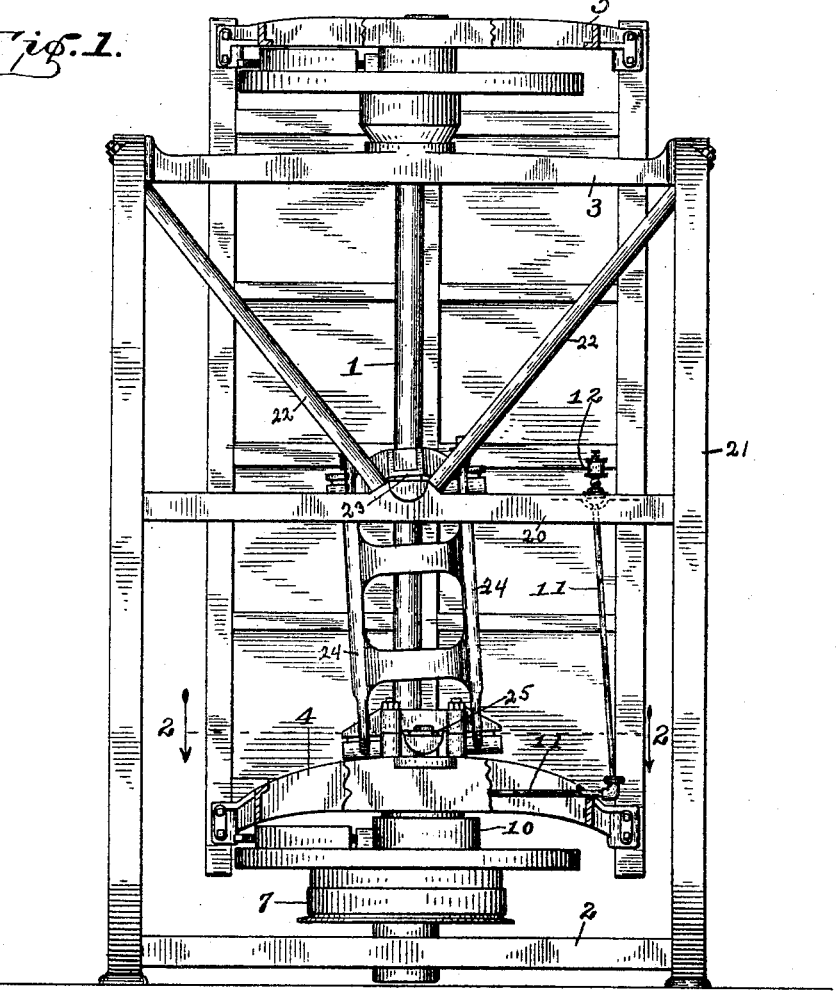

Referring to the accompanying drawings, which are made a part hereof, and on which similar reference characters indicate similar parts, Figure 1 is a side elevation of a machine having one or more bearings embodying my invention; Fig. 2, a horizontal sectional view as seen when looking downward from the dotted lines 2 2 in Figs. 1 and 3; Fig. 3, a detail vertical sectional view as seen from the dotted line 3 3 in Fig. 2, and Fig. 4 a detail horizontal sectional view as seen from the dotted line 4 4 in Fig. 3.

While my invention is designed for and is capable of use with any upright crank-shaft, it is especially calculated to be embodied in a gyratory sifting-machine, such as is shown in Fig. 1 of the drawings, and I have selected, as on the whole best suited to fully illustrate the novel features which constitute the subject-matter of my present invention, that bearing through which the gyratory structure is driven which is near the lower end of the shaft just above the step in which the lower end of said shaft rests, and I will therefore especially describe this particular bearing, referring only incidentally to the other parts.

The crank-shaft 1 is mounted in a step in a bridge-tree 2 at the lower end of the machine and in a suitable bearing in a bridge-tree 3 at the upper end of the machine, being held by said bearings in a fixed position. It engages with the frames 4 and 5, which in the machine in question rigidly connect the gyratory sieve-boxes and are the part of the gyratory structure upon which the crank-shaft immediately operates.

While the gyratory structure may be supported from the frame in any approved manner, I have illustrated a construction for this purpose similar to that shown in Patent No. 670,653, to Warrington, wherein the middle bridge-trees 20 of the main supporting-frame 21, rigidly supported and braced at the center by diagonal braces 22, are provided with rocker-like bearings in the center, in which the bearings 23, connected to the double-link structures 24, are mounted. Said double-link structures 24 are connected by similar rocker-like bearings 25 and suitable stirrups to the lower bridge-frames 4 of said gyratory structure. Said gyratory structure is thus chiefly supported from a central point in a manner which will permit it to swing in both directions, as will be readily understood.

Figure 4:
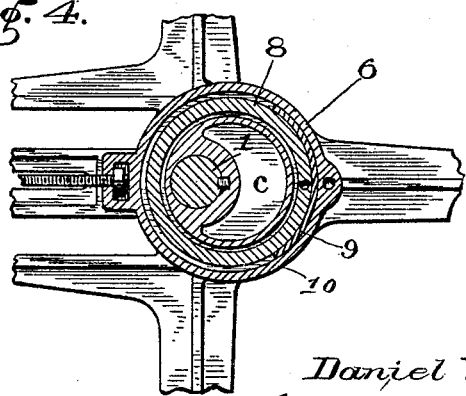

Referring now more especially to Figs. 3 and 4, it will be observed that the shaft 1 passes centrally up through the other parts and has a wheel-like structure 6 rigidly secured thereto near its lower end. Either connected to or formed integrally with this wheel-like structure is the band wheel or pulley 7, over which the belt runs which drives the machine. Within the structure 6 and arranged eccentrically to the shaft 1 is an annular cavity into which the flange 8, connected to or formed with the frame part 4, extends. Within said cavity at one side and seated in a suitable recess therein is a "brass" or plate of antifriction metal 9, against which the annular flange 8 bears, said brass being on what in ordinary construction would be termed the "fat" side of the eccentric. That portion of the structure 6 outside the annular cavity therein and which contains and carries the brass 9 is in itself an annular flange 10, as best shown in Fig. 4, and this flange in my improved construction bears against the annular flange 8 on the driven structure and through said flange imparts motion to said driven structure. In other words, in this construction the eccentric has an outer ring which surrounds the flange 8 (which flange 8 corresponds to an ordinary eccentric-ring) and operates upon the outside instead of the inside of said flange or ring in imparting motion to the driven part. The structure 6, with its annular cavity arranged eccentrically to the shaft, is of course, generally speaking, in effect a crank or the equivalent of a crank, and the cavity in question takes the place of a crank-pin and may be denominated a "hollow crank-pin," while the sleeve 8, which extends down into said cavity, is, in effect, a projecting stud on the operated part, serving the purpose of the orifice in such part with which an ordinary crank-pin engages. Such a hollow crank-pin, however, as above explained, provides a means of lubrication and of maintenance thereof far superior to any attainable with the ordinary forms of cranks or eccentrics. The lubrication is effected by means of a pipe 11, leading from the annular flange 8 on the driven structure 4 to an oil-cup 12, mounted on a portion of the framework which embodies the bridge-trees 2 and 3, said pipe being suitably jointed in order to permit the necessary motion and running in a suitable direction to lead the lubricant from the oil-cup into the cavity in the structure 6, into which the flange 8 extends.

Having thus fully described my said invention, what I claim as new, and desire to secure by Letters Patent, is—

1. In a gyratory sifting-machine, the combination of a suitable framework, the upright shaft journaled in suitable bearings in the top and bottom of said framework, a unitary wheel-like structure rigidly mounted on said shaft and embodying a driving-wheel and containing an eccentric annular cavity open at the top, and a second frame carrying the gyratory sifting structure having an annular flange rigid therewith and extending down into said annular cavity, all substantially as set forth.

2. The combination of a suitable framework, an upright shaft mounted therein, means for driving said shaft, an eccentrically-positioned structure rigidly secured to said shaft and having an annular cavity therein eccentric to the axis of the shaft, a "brass" on the inner face of the outer flange surrounding said cavity and located in a suitable recess on the fat side of the eccentric, a driven structure, an annular flange extending from said driven structure into the annular cavity in the structure secured to the shaft, and a jointed pipe leading therefrom to a suitable source of lubricant-supply carried upon the framework, substantially as set forth.

In witness whereof I have hereunto set my hand and seal, at Indianapolis, Indiana, this 31st day of August, A. D. 1900.

DANIEL W. MARMON. [L. S.]

Witnesses:
CHESTER BRADFORD,
JAMES A. WALSH.